United States Patent [19]
Kori

[11] Patent Number: 6,035,094
[45] Date of Patent: *Mar. 7, 2000

[54] VIDEO SIGNAL PROCESSING APPARATUS AND METHOD FOR SECURING A COPY PROTECTION EFFECT, AN APPARATUS FOR RECORDING/REPRODUCING THE PROCESSED VIDEO SIGNAL AND A RECORD MEDIUM THEREFOR

[75] Inventor: Teruhiko Kori, Kanagawa, Japan

[73] Assignee: Sony Corporation, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/810,247

[22] Filed: Mar. 3, 1997

[30] Foreign Application Priority Data

Mar. 6, 1996 [JP] Japan .................................. 8-078316

[51] Int. Cl.$^7$ ...................................................... H04N 5/76
[52] U.S. Cl. ............................................. 386/94; 386/112
[58] Field of Search ................................ 386/46, 94, 95, 386/1, 19, 10, 112, 12; 380/10, 5, 9; 369/84; H04N 5/76

[56] References Cited

U.S. PATENT DOCUMENTS 4,577,216  3/1986  Ryan .
5,251,041  10/1993  Young et al. .............................. 386/94
5,535,275  7/1996  Sigisaki et al. ............................ 380/10
5,703,859  12/1997  Tahara et al. .............................. 369/84
5,778,064  7/1998  Kori et al. ................................. 386/94

FOREIGN PATENT DOCUMENTS 29 24 453    1/1981    Germany .
WO 96 36174  11/1996   WIPO .

OTHER PUBLICATIONS

"Copy Protection For Video Signals" Research Disclosure.. No. 328, Aug. 1991, Havant GB, p. 617 XP000217930.

*Primary Examiner*—Huy Nguyen
*Attorney, Agent, or Firm*—Frommer Lawrence & Haug, LLP.; William S. Frommer

[57] ABSTRACT

In order to provide a copy protection signal for an analog video signal so as to prohibit recording/reproducing of such video signal by a VCR while permitting the video signal containing the copy protection signal to be displayed, without disturbance, by a television monitor; a macro block of the copy protection signal is constituted by lines of the color video signal containing a color burst signal whose phase is partially inverted and which are interspersed, at intervals, with at least one line containing a normal phase color burst signal. Further, one or more of the lines in the macro block of the copy protection signal which contains the normal phase color burst signal has the latter constituted by pulses with amplitudes greater than those of the normal color burst signal so that color densities will not be disturbed when the video signal is displayed in a television monitor.

16 Claims, 12 Drawing Sheets

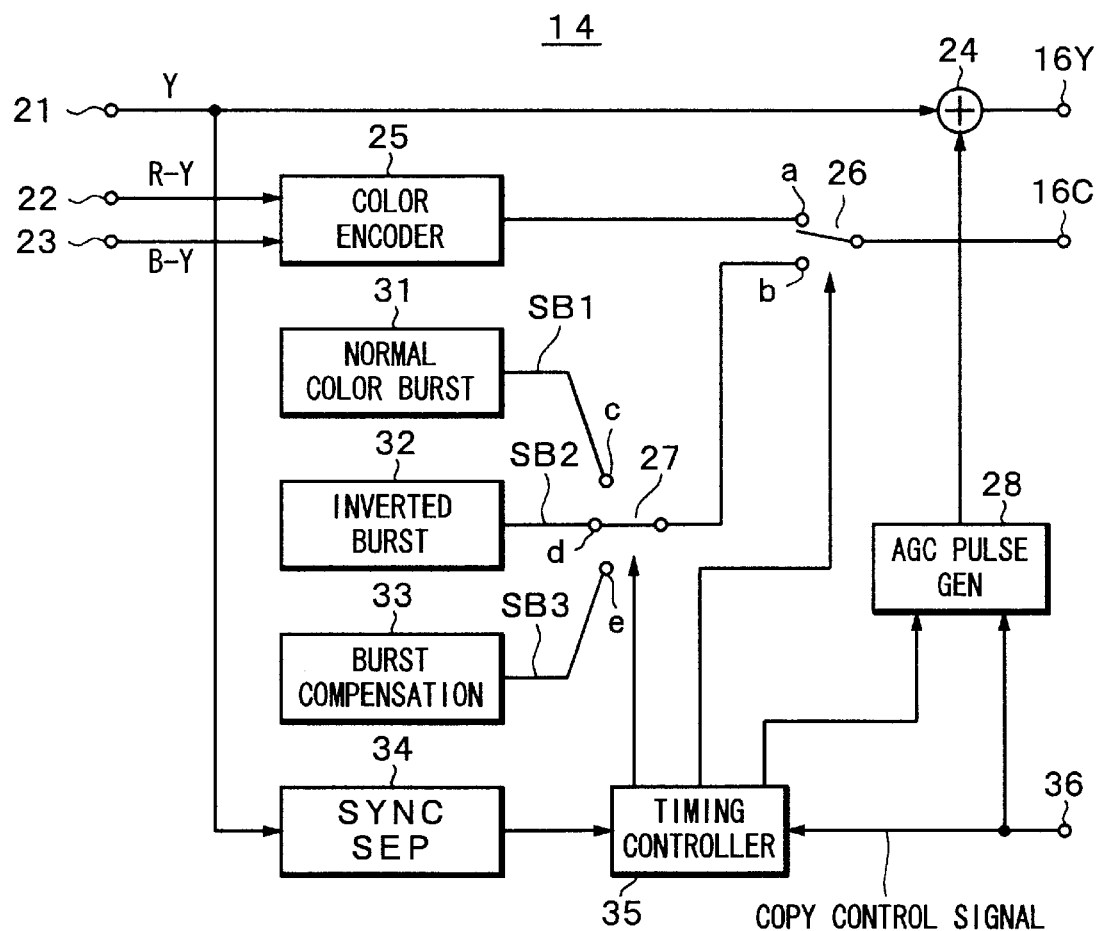

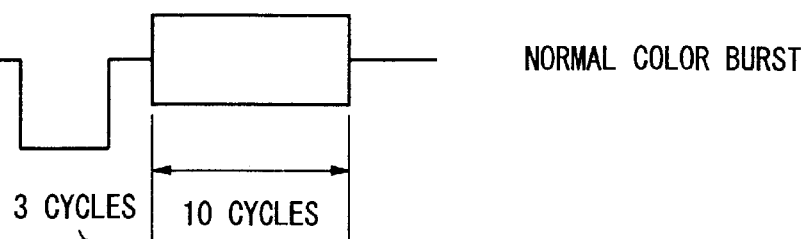
Fig. 4A — NORMAL COLOR BURST (3 CYCLES, 10 CYCLES)
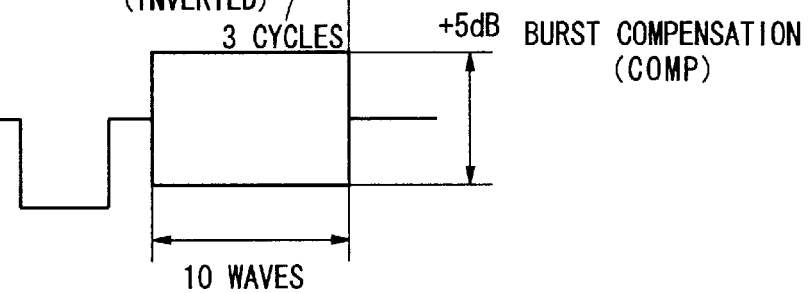
Fig. 4B — INVERTED BURST (INV) — 10 CYCLES (INVERTED), 3 CYCLES
Fig. 4C — BURST COMPENSATION (COMP) +5dB, 10 WAVES
Fig. 5
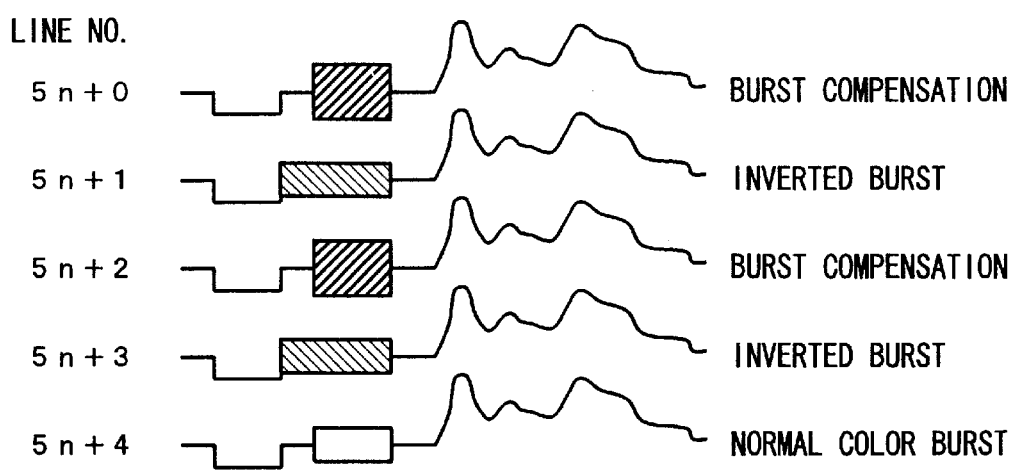
| LINE NO. | |
|---|---|
| 5n+0 | BURST COMPENSATION |
| 5n+1 | INVERTED BURST |
| 5n+2 | BURST COMPENSATION |
| 5n+3 | INVERTED BURST |
| 5n+4 | NORMAL COLOR BURST |

Fig. 10A

| CGMS | | DEFINITION |
|---|---|---|
| 1 | 1 | COPY OPERATION PROHIBITED |
| 1 | 0 | ONE GENERATION OF COPY OPERATION PERMITTED |
| 0 | 1 | NOT USED |
| 0 | 0 | COPY OPERATION PERMITTED |

Fig. 10B

| FLAG | | DEFINITION |
|---|---|---|
| 0 | 0 | DOES NOT GENERATE ANALOG COPY RESTRICTION SIGNAL |
| 0 | 1 | GENERATES ONLY AGC SIGNAL |
| 1 | 0 | GENERATES BOTH AGC AND SECOND COPY PROTECTION SIGNAL |
| 1 | 1 | GENERATES BOTH AGC AND FIRST COPY PROTECTION SIGNAL |

Fig. 11

| | MSB | | | | | | | LSB |
|---|---|---|---|---|---|---|---|---|
| PC0 | 0 | 1 | 1 | 0 | 0 | 0 | 0 | 1 |
| PC1 | CGMS | | COPY SOURCE | | COPY GENERATION | | SS | |
| PC2 | RECORD START | 1 | RECORD MODE | | 1 | DISPLAY | | |
| PC3 | FF | FS | FC | IL | ST | SC | BCSYS | |
| PC4 | 1 | GENRE CATEGORY | | | | | | |

Fig. 12

| | MSB | | | | | | | LSB |
|---|---|---|---|---|---|---|---|---|
| PC0 | 0 | 1 | 0 | 1 | 0 | 0 | 0 | 1 |
| PC1 | CGMS | | COPY SOURCE | | COPY GENERATION | | SS | |
| PC2 | RECORD START | RECORD END | RECORD MODE | | 1 | 1 | 1 | 1 |
| PC3 | DRF | SPEED | | | | | | |
| PC4 | 1 | GENRE CATEGORY | | | | | | |

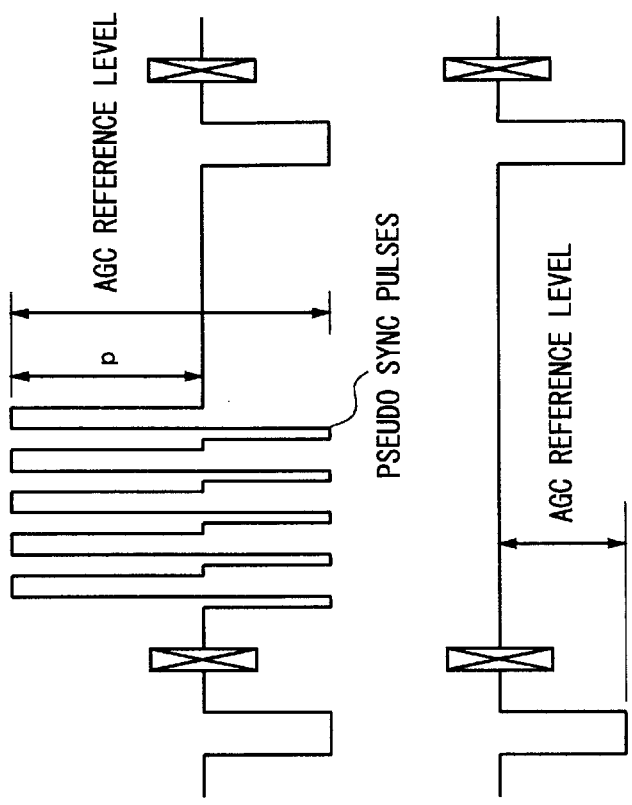
Fig. 13A (PRIOR ART)
Fig. 13B (PRIOR ART)
Fig. 13C (PRIOR ART)

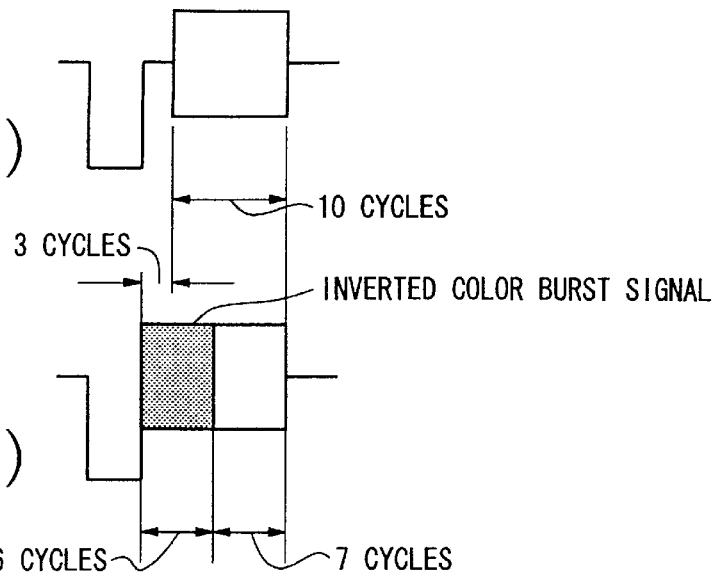
Fig. 16A (RELATED ART)
Fig. 16B (RELATED ART)
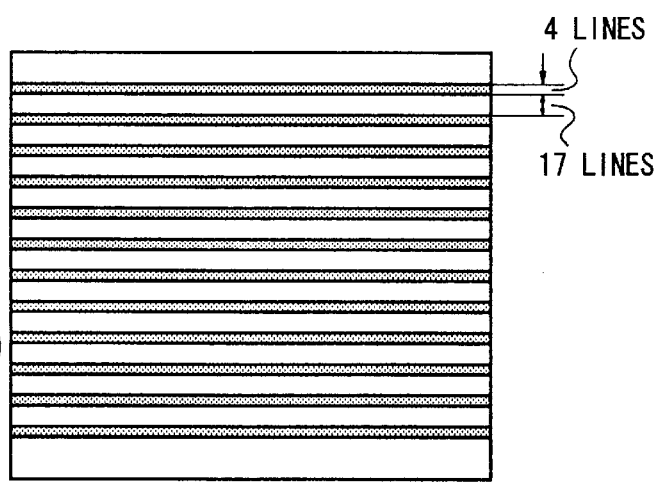
Fig. 16C (RELATED ART)
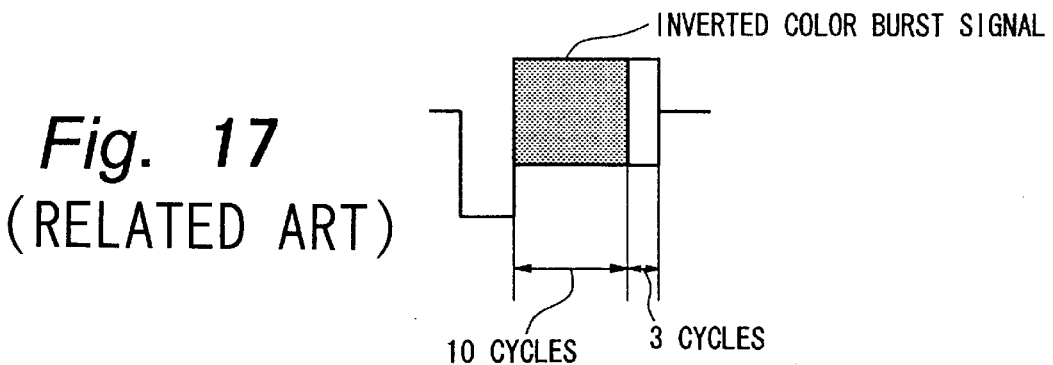
Fig. 17 (RELATED ART)

VIDEO SIGNAL PROCESSING APPARATUS AND METHOD FOR SECURING A COPY PROTECTION EFFECT, AN APPARATUS FOR RECORDING/REPRODUCING THE PROCESSED VIDEO SIGNAL AND A RECORD MEDIUM THEREFOR

BACKGROUND OF THE INVENTION

1. Field of the Invention

This invention relates generally to a video signal processing apparatus and method for securing a copy protection effect, an apparatus for recording/reproducing the processed video signal and a record medium therefor.

2. Description of the Related Art

Digital technologies have now advanced to the point where end-users can easily obtain high quality video signal sources. For example, apart from pre-recorded tapes or software titles, there are digital broadcast terminals and DVDs (digital video disks) for providing the end-users with high-quality video signal sources. Although digital VCRs (video cassette recorders) are gradually becoming common, analog VCRs have been much more widely used than digital VCRs. Providers of such high-quality video signal sources need to pay careful attention to preventing the use of analog VCRs for the unauthorized copying of recorded materials which are afforded copyright protection.

Several copy protecting systems, such as an AGC (automatic gain control) pulse system and a color-stripe system developed by MACROVISION CORPORATION have been proposed for use in analog VCRs. In the AGC pulse system, in order to prohibit copying of a video signal, pulses with a larger level than the normal AGC reference level are placed in an AGC reference level detecting region of the video signal. In other words, pseudo-sync pulses are inserted in part of the vertical blanking intervals of the video signal, as shown in FIG. 13A. More particularly, as shown in the enlarged view of FIG. 13B, five of such pseudo-sync pulses are provided with a level larger by the amount p than the normal AGC reference level within each of the horizontal intervals of that part of the vertical blanking interval to be provided with the copy preventing signal.

In many analog VCRs, particularly intended for home-use, AGC is performed with 1H horizontal synchronous pulses in a vertical blanking interval, as shown in FIG. 13C. Thus, when pseudo-sync pulses with a larger amplitude than the horizontal synchronous pulses are provided in the 1H interval, as in FIGS. 13A and 13B, the AGC circuit acts as though the amplitude of the pseudo-sync pulses is the reference level and performs the AGC for such pulses. Thus, since the AGC level is detected as the level of the pseudo-sync pulses, the horizontal synchronous signal cannot be detected by amplitude separation. Consequently, the video signal cannot be correctly reproduced by the VCR. On the other hand, since the AGC system of television monitors is different from the AGC system of VCRs, the television monitors can normally display the reproduced pictures in spite of the presence of the pseudo-sync pulses.

However, the described AGC pulse system does not work effectively for some models of VCRs, such as, β-type VCRs, 8-mm VCRs, and VHS-type VCRs provided with a long AGC time constant.

In order to solve the above problem, the so-called color stripe system has been proposed. In such color stripe system, the phase of the color burst signal is inverted four lines out of every 21 lines of a reproduced video signal. When the reproduced video signal including the color burst signal whose phase is partially inverted, as aforesaid, is recorded by another home-use analog VCR, an automatic phase controlling (APC) circuit of the analog VCR uses the color burst signal whose phase is partially inverted as the normal color burst signal for the respective lines. Thus, when the video signal is recorded/reproduced, the colors of the lines containing inverted color burst signals are inverted, with the result that the resultant video display has stripes S with inverted colors at every 21 lines, as shown on FIG. 14.

On the other hand, in conventional television receivers, a phase-locked loop (PLL) included in the APC to form a carrier for demodulating a color signal has a long time constant so that, even if the phase of the color burst signal is inverted for at most four successive lines out of every 21 lines, pictures displayed on the screen of a television receiver are not affected. However, some models of television receivers use phase locked loops (PLL) with a short time constant and, in such cases, stripes with inverted colors will be displayed on the screens thereof at the lines corresponding to the inverted color burst signals.

In order to solve the above-noted problem encountered in television receivers having phase-locked loops with a short time constant, the inventor of the present application has proposed another copy protection system in which the phase of the color burst signal is inverted for all lines of the effective screen in only parts of the signal. This system is effective for television monitors or receivers of the type in which the picture quality of the display is adversely affected when the color stripe system is used.

In the analog type home-use VCRs, a chrominance sub-carrier with a frequency of 3.58 MHz for the NTSC system is converted to a low frequency band having a center frequency of 600 to 700 kHz. The resulting color conversion signal in a low frequency band and the luminance signal are frequency-multiplexed and recorded on a magnetic tape. Thus, in the home-use analog VCRs, the color signal is restricted to a frequency band that is very much narrower than the color signal band of television receivers and monitors, and is recorded on the magnetic tape in such narrow color signal band. When the color burst signal included in the recorded video signal is reproduced, since the frequency band is restricted, it tends to expand back and forth on the time axis in comparison with the original signal prior to recording. For example, FIG. 15A shows an original color burst signal a prior to recording, and FIG. 15B shows a color burst signal $a^1$ that has been reproduced by an analog type home use VCR. In other words, when the original color burst signal a preceded by a horizontal synchronous signal h, as shown in FIG. 15A, is recorded on a magnetic tape and reproduced, the color burst signal $a^1$ expands back and forth on the time axis as shown in FIG. 15B.

In view of the above noted characteristic, it has been proposed to partially invert the phase of the color burst signal for performing a copy protection function. For example, in each of the normal lines, 10 cycles of sub-carrier of a normal color burst signal are preceded by the horizontal synchronous signal h, as shown in FIG. 16A. In order to provide a copy protection effect, selected lines are each provided with six cycles of sub-carrier of the inverted color burst signal and with seven cycles of sub-carrier of the normal color burst signal whose phase is normal so as to provide a copy protection signal, as shown on FIG. 16B. On the screen, 17 lines with the normal color burst signal of FIG. 16A and 4 lines with the partially inverted color burst signal of FIG. 16B are alternately provided at intervals of 21 lines, as shown in FIG. 16C.

When the video signal including lines with the partially inverted color burst signal is reproduced, for example, by a VCR, the color synchronous circuit of the VCR does not follow the PLL, thereby causing deterioration of the picture quality. Thus, protection against unauthorized copying can be accomplished. Of course, even if this video signal is recorded/reproduced by another VCR, normal pictures cannot be obtained from the resulting second generation copy. However, television monitors detect and use the video signal including the partially inverted color burst signal as a nearly normal color burst signal, with the result that the television monitors display the original video signal including lines with the partially inverted color burst signal as a nearly normal signal.

However, since the system described above with reference to FIGS. 16A–16C uses the characteristic resulting from the narrow frequency band of the color signal in certain home-use VCRs, the copy protection effect is not sufficient for other VCRs having a wide color signal band, such as, S-VHS analog VCRs.

In order to improve the copy protection effect, a method in which the number of pulses of the inverted color burst signal is increased has also been considered. For example, as shown in FIG. 17, it has been considered to provide, in each of the lines containing partially inverted color burst signals, a copy protection signal composed of 10 cycles of sub-carrier of the inverted color burst signal and only 3 cycles of sub-carrier of the normal color burst signal. In such case, the copy protection effect is achieved for VCRs with a wide color signal band, but picture quality may be noticeably deteriorated in certain models of television monitors. For example, although colors are not inverted, in the noted models of television monitors, stripes with different densities may appear in the horizontal line direction of the screen or the densities of colors on the entire screen may vary.

OBJECTS AND SUMMARY OF THE INVENTION

Therefore, it is an object of the present invention to provide a video signal processing apparatus and method for securing a copy protection effect in all types of VCRs without significantly disturbing the quality of pictures displayed by television monitors receiving the processed video signal.

Another object of this invention is to provided a recording/reproducing apparatus embodying the video signal processing method, as aforesaid, and a record medium for use therein.

In accordance with an aspect of the present invention, a video signal processing apparatus for restricting recording of an analog output video signal from a source thereof comprises means for interspersing lines containing a color burst signal whose phase is partially inverted with at least one line containing a normal phase color burst signal interposed between each two successive lines having the partially inverted color burst signal so that a television monitor correctly displays the output analog video signal but a video signal recording/reproducing device cannot correctly record/reproduce the output analog video signal.

Similarly, in accordance with an aspect of the present invention, a video signal processing method for restricting recording of an analog output video signal from a source thereof comprises the step of interspersing lines containing a color burst signal whose phase is partially inverted with at least one line containing a normal phase color burst signal interposed between each two successive lines having the partially inverted color burst signal, so that a television monitor correctly displays the output analog video signal but a video signal recording/reproducing device cannot correctly record/reproduce the output analog video signal.

In accordance with another aspect of the present invention, a record medium has recorded therein a digital video signal and information for causing lines containing a color burst signal whose phase is partially inverted to be interspersed, at intervals, with at least one line containing a normal phase color burst signal being interposed between each two successive lines having the partially inverted color burst signal so as to restrict recording of an analog video signal output when reproducing the digital video signal.

It will be appreciated that, in all of the foregoing references to copy protection systems according to the present invention, all lines containing color burst signals whose phase is partially inverted are disposed at intervals and are interspersed with at least one line containing normal phase color burst signals between each two successive lines containing inverted color burst signals which disturb pictures and thereby provide the desired copy protection effect. However, since the inverted color burst signals are placed at intervals of at least one line containing a normal phase color burst signal, the inverted color burst signal does not disturb pictures displayed by television monitors. In other words, in the copy protection systems embodying this invention, the inverted color burst signal disturbs pictures only when a signal recorded on a video tape is reproduced.

The above, and other objects, features and advantages of the invention will be apparent in the following detailed description of illustrative embodiments when read in connection with the accompanying drawings.

BRIEF DESCRIPTION OF THE DRAWINGS

FIG. 3 is a block diagram showing details of an output portion included in the DVD player of FIG. 2 according to the present invention;

FIGS. 4A, 4B and 4C are schematic diagrams showing wave forms of a normal color burst signal, a partially inverted burst signal and a burst compensation signal, respectively, that are employed to provide a copy protection signal in accordance with an embodiment of the present invention;

FIG. 5 is a schematic diagram showing an example of a macro block of a copy protection signal comprised of an arrangement of the normal color burst signal, the partially inverted color burst signal and the burst compensation signal of FIGS. 4A, 4B and 4C in accordance with an embodiment of the invention;

FIGS. 10A and 10B are tables showing respective examples of CGMS and trigger bits for causing a copy protection signal to be generated;

FIG. 11 is a schematic diagram to which reference will be made in explaining a method of recording a CGMS signal in a digital VCR;

FIG. 12 is a schematic diagram to which reference will be made in explaining another method of recording a CGMS signal in a digital VCR;

FIGS. 13A, 13B and 13C are schematic diagrams showing wave forms to which reference will be made in explaining an AGC pulse system according to the prior art and an increase of the amplitude of the copy protection signal that has been reproduced;

FIGS. 16A and 16B are schematic diagrams showing examples of wave forms used in previously proposed copy protection systems, and FIG. 16C is a schematic diagram showing a pattern of lines in which the waveforms of FIGS. 16A and 16B are used; and FIG. 17 is a schematic diagram showing an example of a wave form of another form of copy protection signal that has been considered.

DETAILED DESCRIPTION OF PREFERRED EMBODIMENTS

Figure 1A:
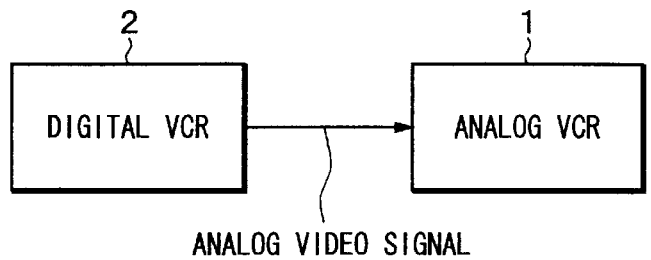
FIGS. 1A, 1B and 1C are block diagrams showing respective examples of video signal recording and reproducing systems that may incorporate the present invention.

In order that the reader of this specification may easily understand the present invention, several applications to which the invention may be applied for affording copy protection will be generally described with reference to FIGS. 1A–1C. In FIG. 1A, an analog video signal reproduced by a digital VCR 2 is then recorded by an analog VCR 1. A cassette tape from which a program is reproduced by the digital VCR 2 may be, for example, a pre-recorded tape. When copy generation control information according to the Copy Generation Management System (CGMS) has been recorded on the tape for indicating a prohibition against copying, recording operation of the analog VCR 1 should be thereby prohibited.

Figure 1B:
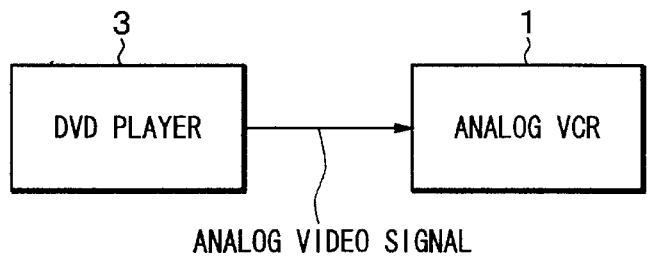

FIG. 1B shows an example in which an analog video signal reproduced by a DVD player 3 is recorded by the analog VCR 1. In this case, when CGMS information recorded on a DVD indicates a prohibition against copying, the recording operation of the analog VCR 1 should again be prohibited.

Figure 1C:
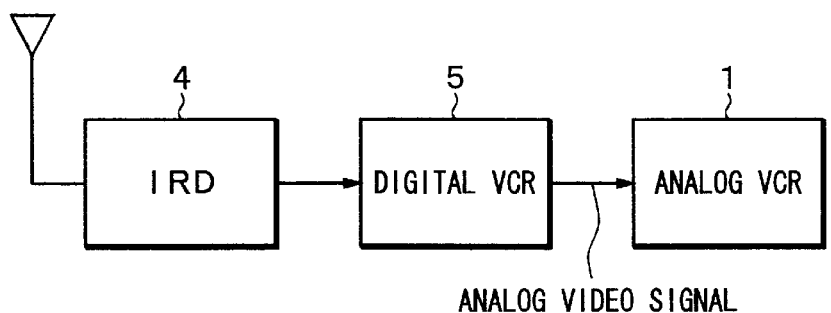

FIG. 1C shows an example in which a program received by an Integrated Receiver Decoder (IRD) or a set top box 4 is recorded by a digital VCR 5, whereupon the resulting recorded signal is reproduced by the VCR 5 as an analog video signal which is then recorded by the analog VCR 1. Generally, the digital VCR 5 can record a digital broadcast program one time as a digital signal or an analog signal. However, by means of copy protection, the signal recorded in digital VCR 5 is prohibited from being copied by the analog VCR 1. Sometimes, by means of copy protection, the video signal received by the IRD 4 is prohibited from being copied directly by the analog VCR 1.

In the cases shown in FIGS. 1A, 1B and 1C, according to the present invention, the analog VCR 1 may be prohibited from performing a copying operation. However, in that event, analog video signals that are output from the digital VCR 2, the DVD player 3 and the digital VCR 5 may still be satisfactorily displayed on television monitors.

Figure 2:
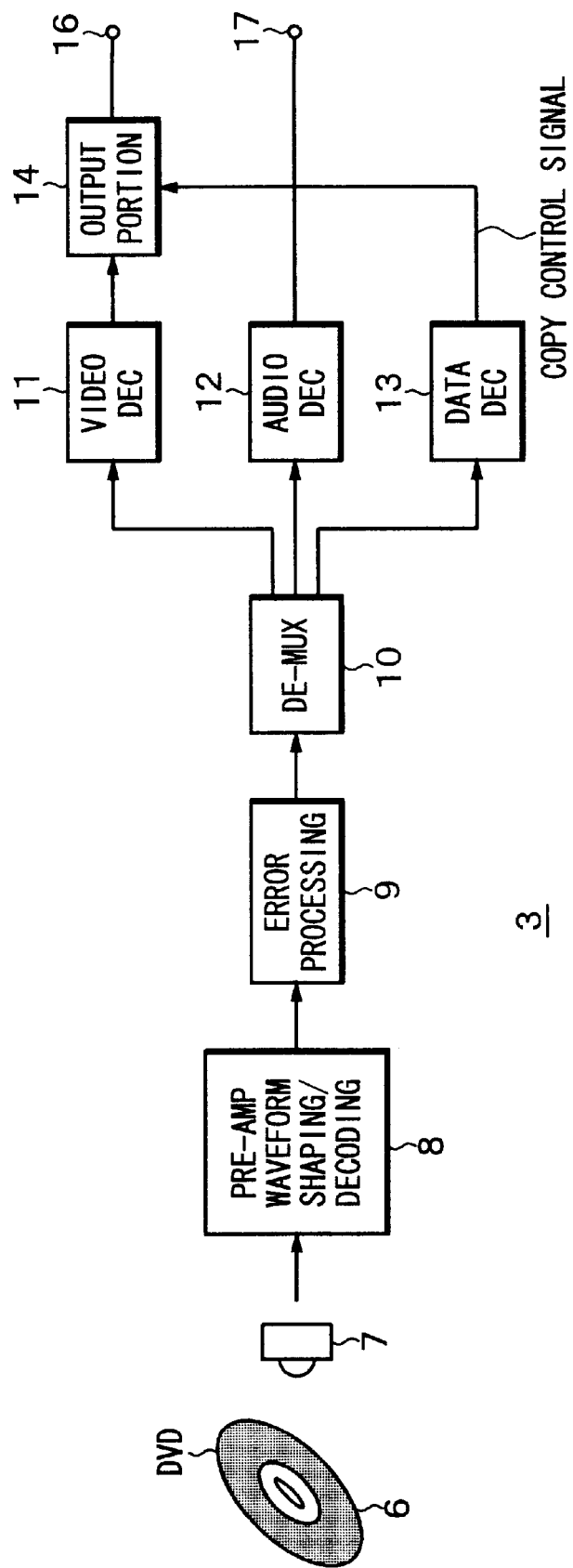
FIG. 2 is a block diagram showing the overall arrangement of a DVD player included in the system of FIG. 1B in accordance with an embodiment of the present invention.

Referring now to FIG. 2, it will be seen that, in the DVD player 3 of an embodiment of the present invention shown in FIG. 1B, a digital signal that has been compressed and encoded according to the MPEG standard or the like is read from a DVD 6 by an optical pick-up 7. The reproduced digital signal is supplied from the optical pick-up 7 through a preamplifier and wave form shaping/decoding circuit 8 to an error processing circuit 9 which decodes an error correction code and corrects any errors in the reproduced digital signal. The corrected digital output signal from the error processing circuit 9 is supplied to a demultiplexer 10 which separates video data, audio data and control digital data from the reproduced signal. The video data is supplied to a video decoder 11 which decodes the compressed/encoded signal into an analog video signal and supplies the latter to an output portion 14 incorporating a feature of the present invention to be later described. The output portion 14 supplies an analog video signal, with a copy protection signal selectively added thereto, to an output terminal 16. The audio data separated by the demultiplexer 10 is supplied to an audio decoder 12 which decodes the compressed/ encoded signal into an analog audio signal and supplies the latter to an output terminal 17. The control digital data separated by the demultiplexer 10 is supplied to a digital data decoder 13 which decodes the digital control data. When the digital control data includes CGMS data, the data decoder 13 generates a copy control signal corresponding thereto and supplies such copy control signal to the output portion 14 of the DVD player 3.

As shown in FIG. 3 by way of example, the output portion 14 of the DVD player 3 may receive the reproduced video signal from the video decoder 11 as an analog component signal. In such case, a luminance signal Y, which includes a synchronous signal, and color difference signals R-Y and B-Y are supplied to input terminals 21, 22 and 23, respectively. The luminance signal Y is supplied from input terminal 21 through an adding device 24 to an output terminal 16Y. The color difference signals R-Y and B-Y are supplied from input terminals 22 and 23 to a color encoder 25 for orthogonally modulating a carrier color signal with two phases and for including a color burst signal in the carrier color signal. The resulting carrier color signal is supplied from the color encoder 25 to one input terminal a of a switcher 26. The switcher 26 selectively engages the input terminal a for supplying the carrier color signal including the normal color burst signal from the color encoder 25 to an output terminal 16C. The switcher 26 is switchable to engage an input terminal b which, in accordance with the present invention as hereinafter described in detail, alternatively receives a normal color burst signal preceded by an inverted color burst signal whose phase is inverted relative to that of the normal color burst signal and which is referred to as a copy protection signal, or a burst compensation signal with a larger amplitude than the normal color burst signal but with the same phase as the latter. Each of the copy protection signal and the burst compensation signal is timed to have a duration equal to that of the normal color burst signal. Further, the previously mentioned AGC pulse system may also be employed in the embodiment of the present invention being described with reference to FIG. 3.

Thus, the adding device 24 also receives AGC pulses from an AGC pulse generator 28 for adding such AGC pulses to the luminance signal Y. The AGC pulse generator 28 generates two types of AGC pulses that differ in their levels so as to effect the desired copy protection. The AGC pulse generator 28 selects one of the two types of AGC pulses to be supplied to the adding device 24 in response to a copy control signal supplied from the data decoder 13 (FIG. 2) to an input terminal 36.

The color burst signal supplied to the input terminal b of the switcher 26 is obtained from an output terminal of a switcher 27, and the switchers 26 and 27 are controlled in accordance with respective output signals from a timing control 35 which is also under the control of the copy control signal supplied from the data decoder 13 to the input terminal 36. When such copy control signal from the decoder 13 represents permission to perform a copy operation, timing controller 35 causes the switcher 26 to continuously select its input terminal a with the result that the normal color burst signal included with the carrier color signal generated in the color encoder 25 is supplied to the output terminal 16C. On the other hand, when the copy control signal from data decoder 13 represents a prohibition of the copy operation, timing controller 35 responds to such copy control signal by causing change-over of the switcher 26 to its input terminal b for a period of time longer than the duration of the normal color burst signal that is included with the carrier color signal issuing from the color encoder 25. During the time that the switcher 26 engages its input terminal b, the switcher 27 is selectively made to engage its input terminals c, d and e by the timing controller 35 so as to provide respective lines of the video signal with the previously mentioned copy protection signal or burst compensation signal in place of the normal color burst signal included with the carrier color signal issuing from the encoder 25, with the result that the analog VCR 1 (FIG. 1B) is prohibited from recording the video signals obtained from the output terminal 16Y and 16C (FIG. 3).

The synchronous signal included in the luminance signal Y applied to the input terminal 21 (FIG. 3) is separated therefrom by a synchronous separating circuit 34 and is supplied from the latter to the timing controller 35 along with the copy control signal received from the input terminal 36.

A normal color burst signal SB1 generated by a burst signal generator 31 is supplied to the input terminal c of the switcher 27. An inverted color burst signal having its phase inverted in respect to the normal color burst signal SB1 is included in a burst signal SB2 which is generated by a signal generator 32 and is supplied to the input terminal d of the switcher 27. Finally, a burst compensation signal SB3 having the same phase but a larger amplitude than the normal color burst signal is generated by a signal generator 33 and is supplied to the input terminal e of the switcher 27.

As shown in FIG. 4A, the normal color burst signal SB1 may be composed of 10 cycles of sub-carrier, whereas, as shown in FIG. 4B, the color burst signal SB2 may be composed of 13 cycles of sub-carrier whose phase is at least partially inverted relative to the phase of the normal color burst signal SB1. More specifically, in the embodiment shown in FIG. 4B, the color burst signal SB2 is timed to precede the timing of the normal color burst signal SB1 by a period of three cycles of sub-carrier. Further, the first 10 cycles of sub-carrier of the signal SB2 have their phase inverted relative to the phase of the normal color burst signal SB1, while the concluding three cycles of sub-carrier of the signal SB2 have the same phase as the normal color burst signal SB1. As shown in FIG. 4C, the burst compensation signal SB3 is of the same duration as the normal color burst signal SB1, that is, is composed of 10 cycles of sub-carrier, with the amplitude of such cycles being different from, for example, being larger than the amplitude of the cycles of the signal SB1, as hereinafter described in detail.

Since the normal color burst signal SB1 generated by the signal generator 31 has a predetermined phase relation with the color subcarrier signal employed in the color encoder 25, it will be apparent that the normal color burst signal SB1 corresponds to the normal color burst signal that is included in the output of the color encoder 25 supplied to the terminal a of the switcher 26. Thus, if desired, the signal generator 31 could be omitted and, in that case, the switcher 26 would be made to engage its input terminal b only during those intervals when the inverted phase portion of the color burst signal SB2 and the burst compensation signal SB3, respectively, are to be thus supplied through switcher 27 to input terminal b of switcher 26. Further, in the circuit arrangement shown in FIG. 3, the synchronous signal for the timing controller 35 is separated from the luminance signal Y and the color encoder 25 generates a color burst signal. However, if desired, an additional circuit may be provided for generating the synchronous signal and the color burst signal to be added to the luminance signal and the carrier color signal, respectively.

Referring now to FIG. 5, it will be seen that, in an embodiment of the present invention there illustrated, the minimum structural unit or macro block of the copy protection signal consists of five successive lines of the video signal which are identified as lines [5n+0] to [5n+4]. The first and third lines of the macro block of the copy protection signal, namely, line [5n+0] and line [5n+2] contain the burst compensation signal SB3 illustrated in FIG. 4C. The second and fourth lines of the macro block, namely, line [5n+1] and line [5n+3] are lines containing the partially inverted color burst signal SB2 of FIG. 4B. Finally, the fifth line of the macro block, that is, the line [5n+4], is a line containing the normal color burst signal SB1 of FIG. 4A.

Thus, in the embodiment of the present invention illustrated in FIG. 5, each macro block of the copy protection signal has the lines containing the partially inverted color burst signal interspersed with the line containing the normal color burst signal and the lines containing the burst compensation signal which has the same phase as the normal color burst signal so that at least one line containing a normal phase color burst signal is interposed between each two successive lines having the partially inverted color burst phase. Thus, in FIG. 5, the lines [5n+1] and [5n+3] containing color burst signals whose phase is partially inverted, are interspersed or alternated with the lines [5n+0], [5n+2] and [5n+4] which all contain either a burst compensation signal or a normal color burst signal having the same phase. Further, in the arrangement of FIG. 5, at least the line [5n+2] containing a normal phase color burst signal is interposed between the two successive lines [5n+1] and [5n+3] having the partially inverted color burst phase. A block of the copy protection signal provided in accordance with this invention may be comprised of a plurality of the described macro blocks, for example, eight macro blocks may constitute a block of the copy protection signal.

Figure 6:
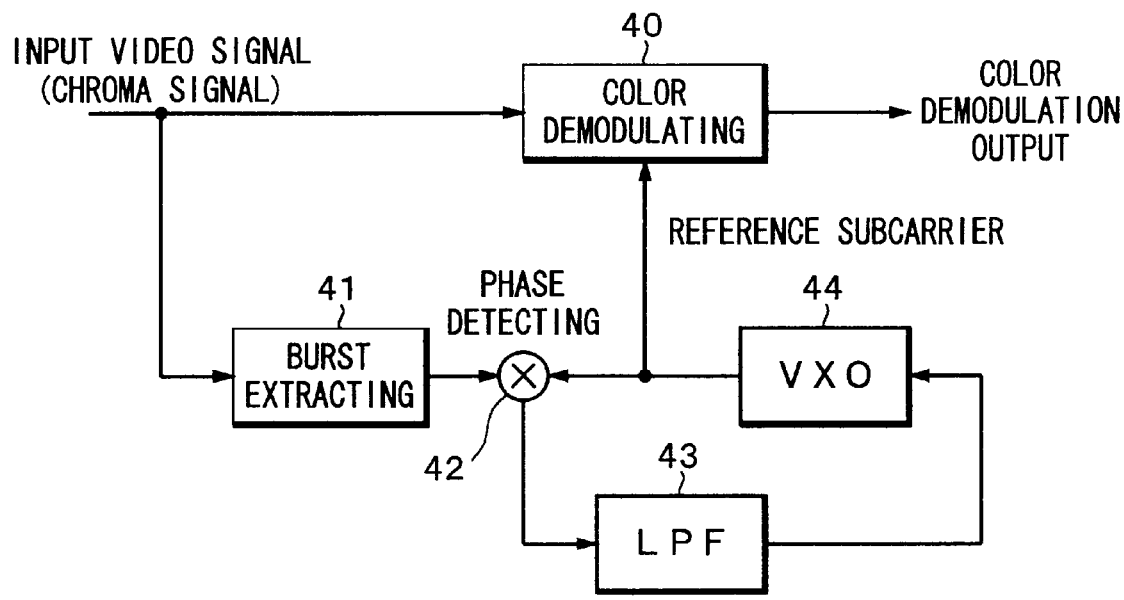
FIG. 6 is a block diagram showing an example of an APC circuit that may be included in a television monitor used for displaying a video signal provided with copy protection in accordance with the present invention.

The affect of such copy protection signal comprised of a macro block containing color burst signals whose phase is partially inverted and burst compensation signals, as described above, upon the operations of a television monitor and a VCR will now be described. In this respect, it will be seen with reference to FIG. 6, that, in a television monitor, an input video signal, or more specifically, a chroma signal extracted therefrom, is supplied to a color demodulating circuit 40, and also to a burst extracting circuit 41. The burst extracting circuit 41 supplies the burst signal extracted from the input chroma signal to a phase detecting circuit 42 which, as shown, may be of the type constituted by a multiplying device that can detect information as to the amplitude of the signal. The phase detecting circuit 42 also receives a reference subcarrier from a VXO (voltage controlled oscillating circuit) 44. The phase detecting circuit 42 compares the phase of the reference subcarrier and the phase of the extracted color burst signal and, in response to a difference therebetween, provides a corresponding error or difference signal through a low pass filter 43 to the VXO 44 for controlling the phase of the reference subcarrier output therefrom. Thus, the reference subcarrier from the VXO 44 is phase-locked to the phase of the color burst signal included in the input video signal. The phase detecting circuit 42, the low pass filter 43 and the VXO 44 thereby constitute a PLL that is phase-locked to the color burst signal. The resultant reference subcarrier generated by the VXO 44 is supplied to the color demodulating circuit 40 which thereby demodulates the colors of the chroma signal.

Figure 7:
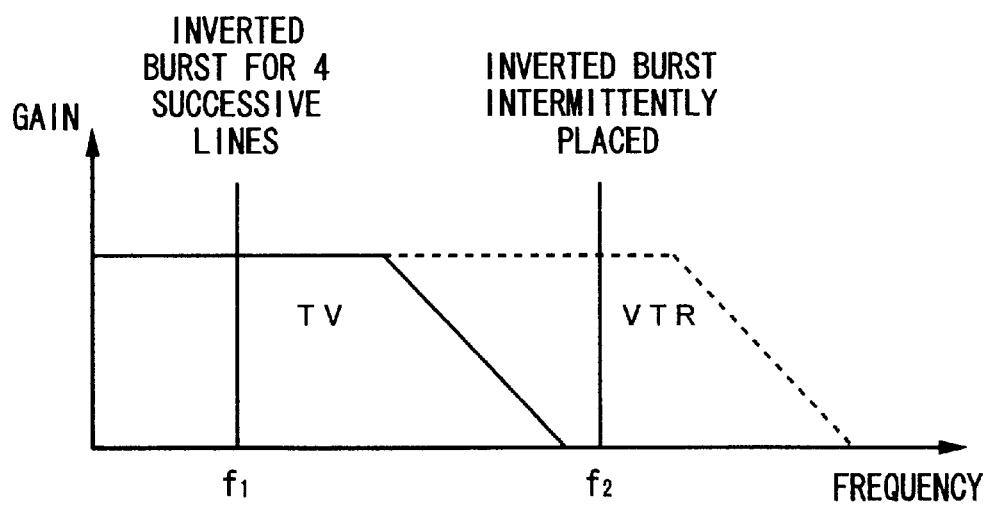
FIG. 7 is a graph showing a frequency response characteristic of a PLL that is included in the APC circuit of FIG. 6, in comparison with the similar frequency response characteristic of an APC in an analog VCR.

The APC circuit described above with reference to FIG. 6 for performing color demodulation in a television monitor has a frequency response characteristic similar to that of a low pass filter, that is, an integral characteristic, as denoted by the solid lines on FIG. 7. Although the APC circuit of a VCR also has an integral frequency response characteristic, as denoted by the dotted lines on FIG. 7, the band width of the APC circuit for a VCR is larger than that of the APC circuit for a television monitor.

Figure 8A:
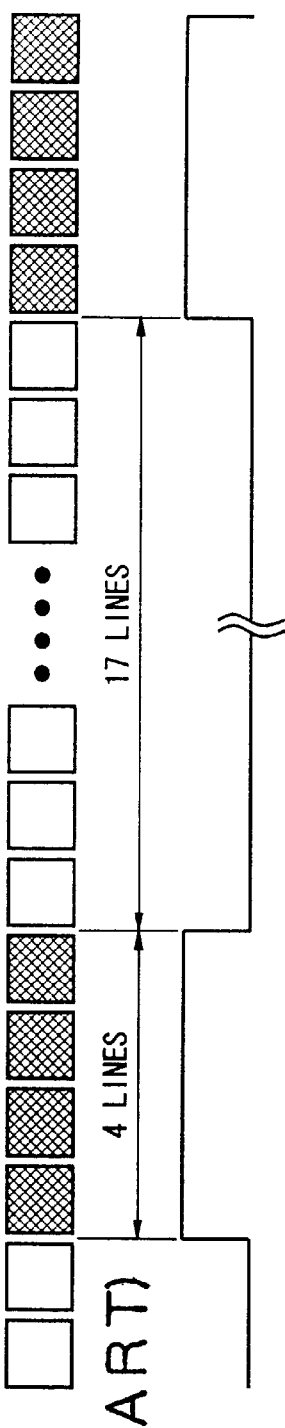
FIGS. 8A and 8B are schematic diagrams illustrating the repetitive frequency of lines containing inverted color burst signals for providing a copy protection effect in accordance with the prior art and in accordance with an embodiment of the present invention, respectively.
Figure 8B:
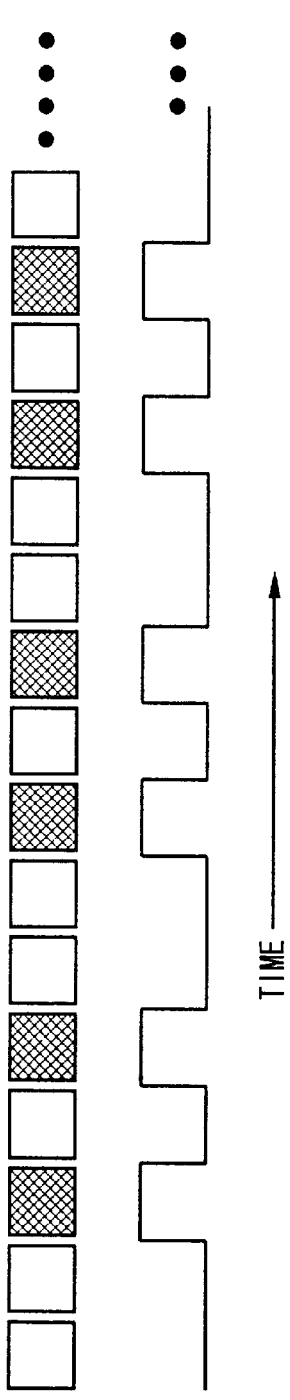

The color burst signal is intermittently supplied with the chroma signal at intervals of the horizontal synchronous signal. The APC circuit extracts only the color burst signal that is intermittently supplied and generates a reference subcarrier. FIGS. 8A and 8B represent the operation of the APC circuit and show that, when only the color burst signal is extracted, a repetitive frequency is formed with transitions appearing only between adjacent lines that contain the inverted color burst signal and the normal color burst signal, respectively.

In the case of the known copy protection system described above with reference to FIGS. 16A–16C, and in which 4 successive lines containing partially inverted color burst signals are provided at intervals of 21 lines, that is, with 17 lines containing normal color burst signals being arranged in succession between successive groups of 4 lines containing partially inverted color burst signals, FIG. 8A shows that such arrangement of the copy protection signal provides a relatively low repetitive frequency $f_1$ which is well within the frequency response range of the APC of the television monitor, as shown in FIG. 7. Thus, the APC of the television monitor is adversely affected by the phase of the inverted color burst signal and the displayed pictures are thereby disturbed.

On the other hand, when lines containing the inverted color burst signal are interspersed or interleaved with at least one line containing a normal phase color burst signal being interposed between each two successive lines having the inverted phase color burst signal therein in accordance with the present invention, as shown in FIG. 8B, the repetitive frequency of the changes between the normal phase color burst signal and the inverted phase color burst signal can be increased, for example, to the frequency $f_2$ which, as shown in FIG. 7, is outside the frequency response range of the APC of a television monitor and within the frequency response range of the APC of a VCR. By reason of the foregoing, in the television monitor, the PLL is not affected by the inverted color burst signal and the display of video pictures is not disturbed. On the other hand, in the VCR, the PLL is affected by the inverted color burst signal so that colors are inverted and the resulting pictures are disturbed in correspondence to the inverted color burst signal.

However, some television monitors have a PLL with a wider frequency response range than is shown on FIG. 7. In such case, even if the lines containing the inverted color burst signal are alternated with lines containing the normal color burst signal, pictures displayed by the television monitor may be disturbed. More specifically, although the colors may not be inverted, the densities of the colors may vary. In order to compensate for such disturbance of pictures displayed by a television monitor having a relative wide frequency response range of its PLL, at least some of the lines interspersed between the lines containing the inverted color burst signal are made to contain the burst compensation signal which is of the same phase as the normal color burst signal, but of greater amplitude than the latter. The compensation or avoidance of disturbance of the displayed pictures by means of the burst compensation signals is effective only when the APC phase detecting circuit 42 of the television monitor is of the type constituted by a multiplying device, as in FIG. 6, so as to be capable of detecting the amplitude of the color burst signal. As described above, since the frequency characteristic of the APC has an integral characteristic, when the phase detecting circuit 42 detects the amplitude of the pulses of the color burst signal, a reduction in the number of pulses of the color burst signal of the normal phase can be compensated by increasing the signal level or amplitude of at least some of such pulses of the normal phase.

For example, if in accordance with an embodiment of the present invention the macro block for the copy protection signal includes two lines for the partially inverted color burst signal shown in FIG. 4B and two lines for the burst compensation signal shown in FIG. 4C, it will be apparent that such four lines would, in the absence of the copy protection signal, contain 40 cycles of sub-carrier of the normal color burst signal shown in FIG. 4A. However, by reason of the presence of the copy protection signal, seven cycles of sub-carrier of the normal color burst signal in each of two of the lines are replaced by inverted color burst signal cycles leaving only a total of six normal color burst signal cycles in the lines containing the partially inverted color burst signal. Since the cycles of sub-carrier of the burst compensation signal are of the same phase as the cycles of the normal color burst signal, there are only 26 cycles of the color burst signal with the normal phase contained in the four lines of the macro block of the copy protection signal being here considered.

In accordance with the present invention, the 20 cycles of the burst compensation signal contained in two of the lines have their amplitudes increased relative to the 6 cycles of the normal color burst signal remaining in the two lines that contain the partially inverted color burst signal so that the 26 cycles having the normal burst phase will provide the effect of 40 cycles of the normal color burst signal. If the 20 cycles in the two lines containing the burst compensation signal are each given an amplitude that is 1.7×the amplitude of each of the 6 cycles of the normal color burst signal remaining in the two lines containing the partially inverted color burst signal, the combined effect of those 26 cycles will be the equivalent of the 40 cycles of the normal color burst signal that would be contained in the respective four lines in the absence of the copy protection signal. The noted increase in amplitude of the cycles of the burst compensation signal is effective to raise the level of the color burst signal over the duration of the macro block for the copy protection signal to the normal level of +5 dB.

When the phase detecting circuit 42 of a television monitor is of a type that cannot detect information in respect to the amplitude of the color burst signal, the described compensation effect cannot be obtained. However, the presence of the burst compensation signal in the macro block of the copy protection signal does not disturb the picture display. In other words, since the phase of the burst compensation signal is the same as the phase of the normal color burst signal, the burst compensation signal functions as the equivalent of a normal color burst signal so long as the relatively increased amplitude of the burst compensation signal cannot be detected.

In the embodiment of the present invention described above with reference to FIG. 5, the macro block for the copy protection signal is composed of two lines for the partially inverted color burst signal, two lines for the burst compensation signal and one line for the normal color burst signal, with the two lines for the partially inverted color burst signal and the two lines for the burst compensation signal being alternately arranged. However, it will be appreciated that the present invention is not limited to the foregoing arrangement of the macro block for the copy protection signal so long as, in such macro block, lines containing the partially inverted color burst signal are spaced from each other by at least one line containing the normal color burst signal or cycles having the same phase as the normal color burst signal, such as, the burst compensation signal. Thus, for example, a macro block of a copy prevention signal embodying the present invention may be composed of one line for the burst compensation signal and one line for the partially inverted color burst signal. Alternatively, a macro block in accordance with an embodiment of the invention may be composed of one line for the normal color burst signal and one line for the partially inverted color burst signal. Moreover, in the macro block composed of five lines, as in FIG. 5, the line [5n+4] which contains the normal color burst signal, may be replaced by a similarly situated line containing the burst compensation signal. With the copy protection signal in the macro block structure being placed on a screen in a predetermined manner, pictures on the screen are substantially disturbed in response to the copy protection signal so that the desired effect of the copy protection is fully realized.

Figure 9A:
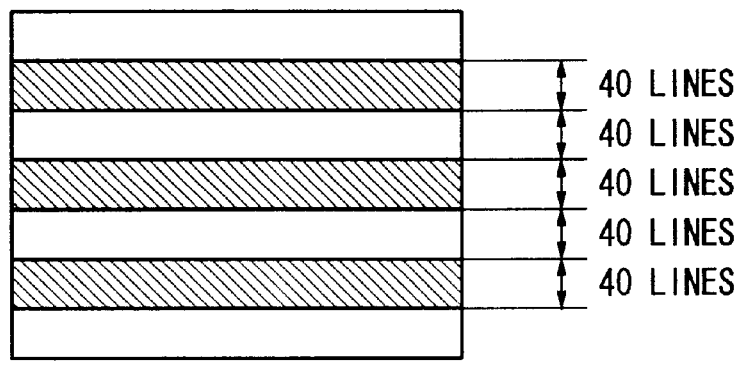
FIGS. 9A and 9B are schematic diagrams showing respective examples of how macro blocks of a copy protection signal according to the invention, for example, as shown in FIG. 5, can be distributed over the screen of a television monitor.
Figure 9B:
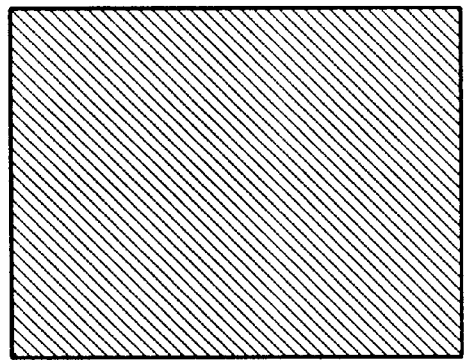
Figure 14:
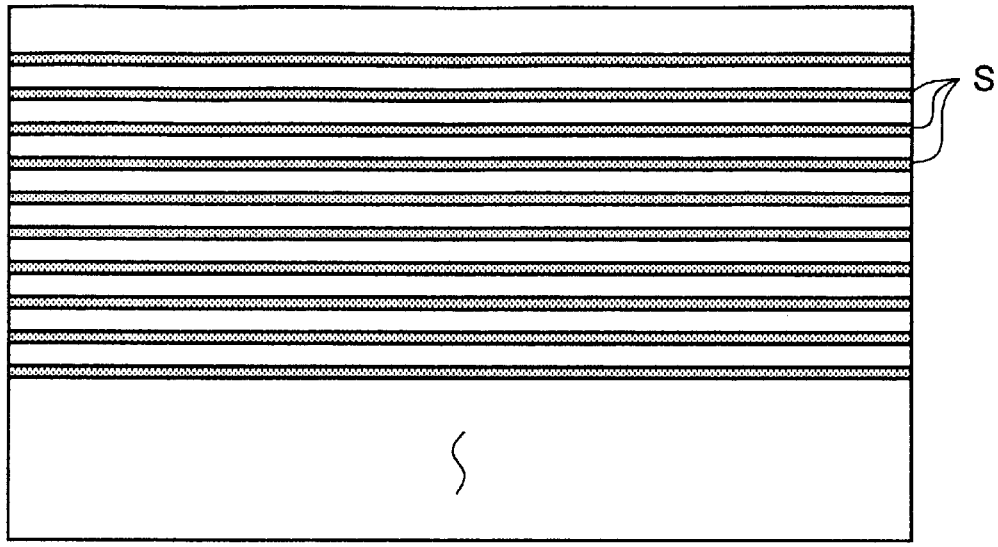
FIG. 14 is a schematic diagram to which reference is made in explaining a color stripe system of the prior art.
Figure 15A:
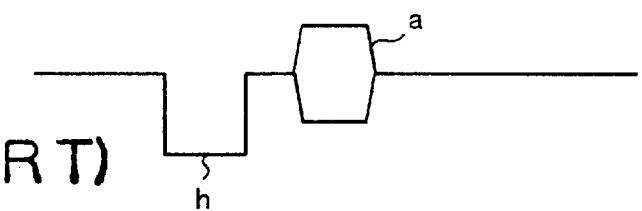
FIGS. 15A and 15B are schematic diagrams showing wave forms of an original color burst signal and of a color burst signal that has been reproduced, respectively.
Figure 15B:
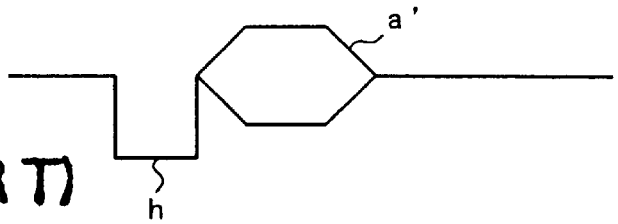

FIGS. 9A and 9B show respective examples of arrangements on a screen of the copy protection signal with such a macro block. More specifically, FIG. 9A shows an example in which blocks for the copy protection signal and blocks for the normal color burst signal that do not include the copy protection blocks are alternately arranged on the screen. In the illustrated example, each block for the copy protection signal extends over 40 horizontal lines on the screen and is composed of 8 macro blocks each consisting of 5 lines, as in FIG. 5. The blocks for the copy protection signal are shown hatched and are spaced from each other by blocks containing only the normal color burst signal and also extending over a respective 40 lines of the screen. Of course, the blocks for the normal color burst signal in FIG. 9A do not include the copy protection signal. Although the blocks for the copy protection signal and the blocks for the normal color burst signal are shown in FIG. 9A as each extending over 40 lines of the screen, it will be appreciated that the number of such lines may be varied at will.

FIG. 9B shows an embodiment of the invention in which the screen is substantially filled with the copy protection blocks. When the copy protection blocks extend over substantially all of the screen, even if a picture disturbance, such as, a change of color densities or saturations takes place on the screen of the television monitor, the obviousness of such disturbance will be minimized.

The copy protection signal may be included in successive fields, or the copy protection signal may only be included intermittently in fields that are at predetermined intervals relative to each other. When blocks of the copy protection signal are placed at the same positions in successive fields, for example, in the positions shown on FIG. 9A, flickering of the display due to the presence of the copy protection signal will decrease. Further, blocks for the copy protection signal and blocks for the normal color burst signal can be alternately disposed in successive fields. Moreover, the blocks for the copy protection signal in a number of fields can be disposed at different positions on the screen for the respective fields.

As shown in FIG. 10A, the CGMS recorded in association with a digital video signal recorded on the DVD 6 in FIG. 2 is defined as follows:

00: copy operation permitted.

01: not used.

10: one generation of copy operation permitted.

11: copy operation prohibited.

When the CGMS only defines or indicates the restriction of digital copy operation, a flag that represents the permission or prohibition of an analog copy operation may be separately defined. Such flag or trigger bits that cause the analog copy restriction signal to be generated may be provided as shown in FIG. 10B. When the trigger bits are "00", they do not cause the analog copy restriction signal to be generated. When the trigger bits are "01", they cause only the AGC signal of the analog copy protection signal to be generated. When the trigger bits are "11", they cause the AG signal and the first copy protection signal according to the present invention to be generated. Such first copy protection signal according to this invention may be composed of the macro blocks shown in FIG. 5 placed as shown in FIG. 9A. Although the trigger bits "10" may not be used, as shown in FIG. 10B, the trigger bits "10" may cause the AGC signal and a second copy protection signal that has a different arrangement from the first copy protection signal to be generated. In this case, the analog copy restriction information is composed of a total of four bits of the CGMS (FIG. 10A) and the trigger bits (FIG. 10B).

In the embodiment described above with reference to FIG. 10B, the generation of the copy control signal of the AGC pulse system and the generation of the copy restriction or protection signal according to the present invention are controlled by the trigger bits. However, the present invention is not limited to such an arrangement. In other words, when the data recorder 13 in FIG. 2 supplies the trigger bits, the generation of the copy restriction signal for the AGC pulse system and the generation of the copy protection or restriction signal according to the present invention can be independently provided.

Various data structures exist for recording such copy restriction information on a record medium. In the case of digital VCRs, the data structures shown in FIGS. 11 and 12 may be used. FIG. 11 shows the structure of video auxiliary data (VAUX) in the form of a pack with a pack header (01100001) (61 h.) in which h represents hexadecimal notation.

In the pack shown on FIG. 11, the CGMS defined as described above with reference to FIG. 10A is recorded as the two high order bits of PC1. Source codes in PC1 are defined as follows:

00: copy operation of analog input.
01: copy operation of digital input.
10: reserved.
11: no information.

The copy generation codes in PC1 are defined as follows:

00: first generation.
01: second generation.
10: third generation.
11: fourth generation.

FIG. 12 shows the structure of auxiliary data of an audio signal (AAUX) for a digital VCR in the form of a pack. The header of this pack is (01010001) (51h). The pack PC1 includes information about copy generation in the same structure as for the VAUX described with reference to FIG. 11.

In the case where the CGMS of the input video signal represents that one generation of copy operation is permitted, then the state of the CGMS on the tape is rewritten to indicate that further copying is prohibited at the time when the input video signal is recorded or first copied.

In the DVD according to an embodiment of the present invention, recorded data is divided into sectors (not shown). At the beginning of each sector, a synchronous signal and a header are added, and such header includes the copy restriction information.

In FIG. 3, the signal generating circuits 31, 32 and 33 are shown as independent blocks. However, the present invention is not limited to such an arrangement. For example, one signal generating circuit may be connected to an amplifier and a phase-delaying circuit which are controlled by the timing controller 35 so that, when the signal generating circuit generates the normal control burst signal and adds it to the inverted color burst signal, the phase-delaying circuit is controlled to effect the necessary phase inversion for a predetermined period. Similarly, when the burst compensation signal is to be provided, the amplifier is controlled to effect a predetermined amplification of the normal color burst signal being generated.

Furthermore, although the copy protection signal in accordance with the present invention has been described as being applied to a component video signal, it is apparent that the copy protection signal embodying the invention may be in the form of a composite signal in which the luminance signal and carrier color signal are superimposed.

Since in accordance with the present invention, as described above, the copy protection signal is composed of macro blocks in which lines for the inverted color burst signal are intermittently disposed and interspersed with lines containing color burst signals having the normal phase, in television monitors having APCs with narrow frequency response ranges, the inverted color burst signal does not disturb the normal display of the color video signal. On the other hand, in VCRs having APCs with wide frequency response ranges, the inverted color burst signal works, that is, is effective to disturb the eventual normal display of an analog video signal reproduced by such VCRs.

Further, since the copy protection signal provided in accordance with the present invention is composed of macro blocks containing lines for the burst compensation signal having an amplitude larger than the amplitude of the normal color burst signal and lines for the inverted color burst signal, the change of color saturations due to the inverted color burst signal in certain of the lines taking the place of the normal color burst signal that would otherwise be present in such lines is compensated in the television monitors.

Moreover, according to the present invention, when lines for the inverted color burst signal are distributed over the entire screen, picture disturbance, such as flickering, in the television monitors can be alleviated.

Furthermore, according to the present invention, when blocks for the copy protection signal are composed of a plurality of macro blocks and are placed at the same positions in each field, picture disturbance due to flickering of the screen can be reduced.

Finally, since changes in color densities or saturations due to the inverted color burst signal included in the copy protection signal are compensated by the burst compensation signal when the reproduced video signal is displayed in television monitors, the positions of the blocks of the copy protection signal can be moved from one field to the next without flickering of the screen.

Although illustrative embodiments of the invention and various modifications thereof have been described in detail herein, it is to be understood that the invention is not limited thereto, and that various changes and further modifications may be effected therein by a person skilled in the art without departing from the scope or spirit of the invention as defined in the appended claims.

What is claimed is:

1. A video signal processing apparatus for restricting recording of an analog color video signal output from a video signal source and having successive fields each comprised of predetermined numbers of lines at least some of which contain a normal color burst signal of a predetermined normal phase, said apparatus comprising:

means for generating a color burst signal having a phase which is partially inverted in respect to said predetermined normal phase;

means for placing said color burst signal having said partially inverted phase in selected lines of at least some of said fields; and means for interspersing said lines in which said color burst signal having the partially inverted phase is placed with at least one of said lines containing a color burst signal of said normal phase being interposed between each two successive lines having said color burst signal with the partially inverted phase such that there are never two of said lines having said color burst signal with the partially inverted phase together so that a copy protection signal is defined by said lines in which said color burst signal with the partially inverted phase is placed and said at least one line with said color burst signal of the normal phase interposed therebetween to permit a color television monitor to correctly display said analog color video signal while a video signal recording/reproducing device cannot correctly record/reproduce the analog color video signal output from said source.

2. The video signal processing apparatus set forth in claim 1, further comprising means for providing said at least one of said lines containing a color burst signal of said normal phase with an amplitude of the respective color burst compensation signal which is substantially larger than the amplitude of said color burst signal of said normal phase.

3. The video signal processing apparatus as set forth in claim 1, wherein lines containing said color burst signal of said normal phase are alternated with said lines containing the color burst signal whose phase is partially inverted so as to define said copy protection signal.

4. The video signal processing apparatus as set forth in claim 1,
wherein said lines containing the color burst signal whose phase is partially inverted are disposed in successive fields of said color video signal.

5. The video signal processing apparatus as set forth in claim 1,
wherein said lines containing the color burst signal whose phase is partially inverted are only present in intermittently occurring fields.

6. The video signal processing apparatus as set forth in claim 1,
wherein said at least one of said lines containing a color burst signal of said normal phase and at least one of said lines containing said color burst signal with said partially inverted phase constitute a macro block for said copy protection signal; and
wherein at least one said macro block comprises a block for said copy protection signal.

7. The video signal processing apparatus as set forth in claim 6,
wherein lines of each of said fields apart from said block contain said normal color burst signal.

8. The video signal processing apparatus as set forth in claim 6,
wherein said block is constituted so that the respective lines occupy a major portion of a screen of said television monitor.

9. The video signal processing apparatus as set forth in claim 6,
wherein said block occupies the same position in a main portion of a screen of said television monitor in each of said fields of the color video signal.

10. The video signal processing apparatus as set forth in claim 6,
wherein said block occupies a different position of each field at a main portion of a screen of said television monitor.

11. The video signal processing apparatus as set forth in claim 6,
wherein said block is moved in each field of a main portion of a screen of said television monitor.

12. A video signal processing method for restricting a recording of an analog color video signal output from a video signal source and having successive fields each comprised of predetermined numbers of lines at least some of which contain a normal color burst signal of a predetermined normal phase, said method comprising the steps of:
generating a color burst signal having a phase which is partially inverted in respect to said predetermined normal phase;
placing said color burst signal having said partially inverted phase in selected lines of at least some of said fields; and
interspersing said lines in which said color burst signal having the partially inverted phase is placed with at least one of said lines containing a color burst signal having said normal phase being interposed between each two successive lines having said color burst signal with the partially inverted phase such that there are never two of said lines having said color burst signal with the partially inverted phase together so that a copy protection signal is defined by said lines in which said color burst signal having the partially inverted phase is placed and by said at least one line having said color burst signal of the normal phase interposed therebetween to permit a color television monitor to correctly display said analog color video signal while a video signal recording/reproducing device cannot correctly record/reproduce the analog color video signal output from said source.

13. The video signal processing method as set forth in claim 12,
further comprising the step of providing said at least one of said lines containing a color burst signal of said normal phase with an amplitude of the respective color burst compensation signal which is substantially larger than the amplitude of said color burst signal of said normal phase.

14. A record medium having recorded thereon a digital color video signal made up of successive fields comprised of predetermined numbers of lines at least some of which contain normal color burst signals of a normal phase, said record medium further having information recorded thereon for causing selected ones of said lines to contain a color burst signal of a phase which is partially inverted in respect to said normal phase, with at least one of said lines containing a color burst signal of said normal phase being interposed between each two successive lines having said color burst signal with said partially inverted phase such that there are never two of said lines having said color burst signal with the partially inverted phase together for defining a copy protection signal so that, when said digital color video signal is reproduced from said record medium to provide a corresponding analog color video signal, said copy protection signal restricts reproducing of said analog color video signal.

15. The record medium having recorded thereon a digital color video signal as set forth in claim 14,
wherein said information further causes said at least one of said lines containing a color burst signal of said normal phase to have an amplitude of the respective color burst compensation signal which is substantially larger than the amplitude of said color burst signal of said normal phase.

16. A video signal processing apparatus for restricting recording of an analog color video signal output from a video signal source and having successive fields each comprised of predetermined numbers of lines at least some of which contain a normal color burst signal of a predetermined normal phase, and for outputting the reproduced signals to a television monitor, said apparatus comprising:
means for generating a color burst signal having a phase which is partially inverted in respect to said predetermined normal phase;
means for placing said color burst signal having said partially inverted phase in selected lines of at least some of said fields; and
means for interspersing said lines in which said color burst signal having the partially inverted phase is placed with at least one of said lines containing a color burst signal of said normal phase being interposed between each two successive lines having said color burst signal with the partially inverted phase such that there are never two of said lines having said color burst signal with the partially inverted phase together wherein the repetitive frequency of the changes between said color burst signal of said normal phase and said color burst signal having the partially inverted phase is outside the frequency response range of the APC of said television monitor and within the frequency response range of the APC of said video signal processing apparatus.

* * * * *